H. S. TOWNSEND.
Seed and Grain Sieve.
No. 66,188.
Patented June 25, 1867.
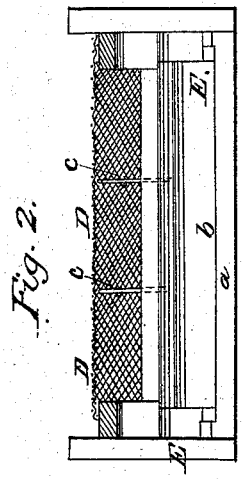
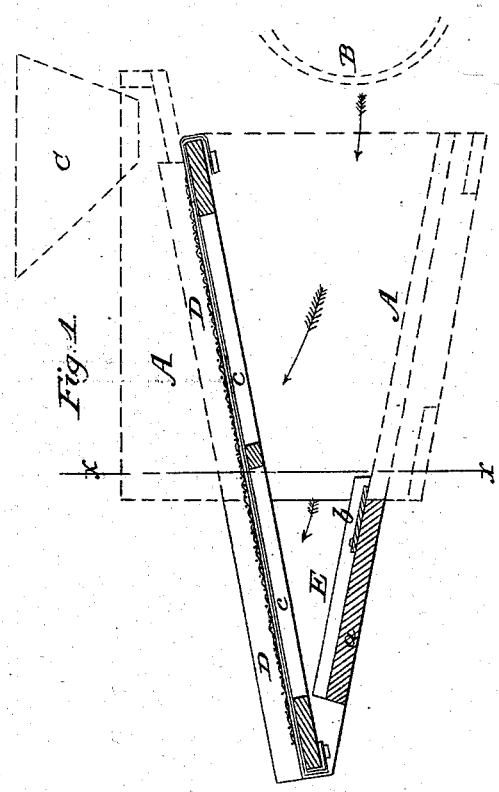
Witnesses:
Inventor:

United States Patent Office.

H. S. TOWNSEND, OF GREENVALE, ILLINOIS.

*Letters Patent No. 66,188, dated June 25, 1867.*

SEED AND GRAIN-SIEVE.

*The Schedule referred to in these Letters Patent and making part of the same.*

TO ALL WHOM IT MAY CONCERN:

Be it known that I, H. S. TOWNSEND, of Greenvale, Jo Daviess county, Illinois, have invented a new and improved Seed or Grain-Sieve; and I do hereby declare that the following is a full, clear, and exact description thereof, which will enable others skilled in the art to make and use the same, reference being had to the accompanying drawings, forming part of this specification, in which—

Figure 1 is a longitudinal vertical section of my invention.

Figure 2 is a vertical cross-section of the same taken on the line $x\,x$, fig. 1.

Similar letters of reference indicate corresponding parts.

This invention consists in the application of an additional shoe outside of and above the ordinary grain-shoe of a fanning-mill or threshing machine, whereby the sieve is prolonged, and the grain passed over a larger perforated surface. Thereby the complete separation of the fine from the coarse grain or seed will be effected. The invention also consists in the use of strong wire supports, which are arranged under the wire netting to keep the same flat and prevent it from sagging.

The invention can be readily applied to machines that are already in operation, and will greatly facilitate the thorough separation of the seed or grain.

A represents an ordinary grain-shoe; B is the fanning-cylinder, and C the hopper. All these parts are of usual construction, being parts of an ordinary threshing machine, and are shown by red lines in fig. 1. D is a wire screen, which is secured between the cheeks of the shoe A in any suitable manner. This screen extends beyond the end of the shoe A, as is clearly shown in fig. 1, and its outer end rests upon or is secured in an additional shoe, E. On the inner edge of the oat-board $a$ of the shoe E is formed a projecting lip, $b$, which rests upon the extreme edge of the oat-board of the shoe A, and thus these boards are connected, as shown. It will be seen that that portion of the screen which projects beyond the shoe A is about as long as the other part of it, or, in other words, the length of the screen is about doubled by this invention. Below the wire netting is stretched across the frame of the screen D a number of strong wires, $c\,c$, which support the wire netting and hold the same flat. These wire braces or supports are no equivalent for wooden laths, as they are not only elastic, but are small and round, and do consequently not interfere with the flow of seed or grain through the meshes, nor do they only divide the screen in so many portions, (high on the edges and low in the centre,) as wooden supports should do.

Having thus described my invention, what I claim as new, and desire to secure by Letters Patent, is—

1. Extending the screen D of a grain or seed separator or threshing machine beyond the ordinary grain-shoe, and supporting its outer end by an additional shoe, E, substantially as and for the purpose herein shown and described.

2. The application of the wire braces $c\,c$, below the netting of a wire screen D, for the purposes set forth, and substantially as herein shown and described.

H. S. TOWNSEND.

Witnesses:
  WM. F. MCNAMARA,
  ALEX. F. ROBERTS.